(12) United States Patent
Yang et al.

(10) Patent No.: US 6,620,028 B2
(45) Date of Patent: Sep. 16, 2003

(54) APPARATUS FOR CUTTING A WAFER

(75) Inventors: Sun Mo Yang, Cheonan (KR); Dong Kuk Kim, Cheonan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/103,465

(22) Filed: Mar. 22, 2002

(65) Prior Publication Data

US 2003/0027494 A1 Feb. 6, 2003

(30) Foreign Application Priority Data

Jul. 31, 2001 (KR) .................................... 2001-0046264

(51) Int. Cl.[7] ................................................ B24B 1/00
(52) U.S. Cl. ........................... 451/5; 451/6; 125/13.01; 125/15; 125/16.01
(58) Field of Search ..................... 125/15, 12, 13.01, 125/16.01, 20; 451/5, 6

(56) References Cited

U.S. PATENT DOCUMENTS

| | | | |
|---|---|---|---|
| 6,014,965 A | * | 1/2000 | Nishida ........................ 125/12 |
| 6,086,453 A | * | 7/2000 | Fukuoka et al. ................ 451/5 |
| 6,142,138 A | * | 11/2000 | Azuma et al. ................. 125/14 |
| 6,280,289 B1 | * | 8/2001 | Wiswesser et al. ............. 451/6 |
| 6,494,122 B2 | * | 12/2002 | Kamigaki ....................... 83/13 |

* cited by examiner

Primary Examiner—George Nguyen
(74) Attorney, Agent, or Firm—Lee & Sterba, P.C.

(57) ABSTRACT

The present invention relates to an apparatus for cutting a wafer, wherein the wafer cutting process is performed along a back side of a wafer, a semiconductor chip being formed on the front side thereof, by cutting the wafer along the back side of the wafer by directly recognizing the semiconductor chip shape formed on the front side of the wafer thereby minimizing cutting defects due to sawing blade misalignment.

The present invention includes a hole formed in the center portion of a chuck table on which the wafer, which is facing down, is attached and a camera installed under the hole of the chuck table. After the wafer is properly aligned by the camera recognizing the semiconductor chip shape formed on the front side of the wafer, a wafer cutting process is performed by a sawing blade.

5 Claims, 3 Drawing Sheets

APPARATUS FOR CUTTING A WAFER

BACKGROUND OF THE INVENTION

1. Field of the Invention

The present invention relates to a semiconductor manufacturing device. More particularly, the present invention relates to an apparatus for cutting a wafer along a back side of a wafer.

2. Description of the Related Art

In general, semiconductor manufacturing may be divided into three processes. These processes are semiconductor wafer fabrication, package assembly and testing. Integrated circuits and devices are formed on a wafer during the semiconductor wafer fabrication process. After this process, the wafer is separated into diced chips, and then each diced chip is assembled into a package during the package assembly process.

Conventionally, dicing a wafer is accomplished by mounting the wafer on a chuck table and sawing the wafer using a diamond sawing blade. In the conventional dicing process, because the dicing process is progressed along a scribe line on a front side of a wafer, the side on which a semiconductor chip is formed, circuits of the semiconductor chip may be damaged by chippings generated during the dicing process. Additionally, wire bonding defects may be caused by silicon debris, which is not removed by a cleaning liquid, and which may adhere to an electrode pad.

In an attempt to solve these problems, a conventional method disclosed sawing along a back side of the wafer. According to this conventional method, a detector irradiates infrared rays that penetrate from the back side of the wafer to the front side of the wafer to recognize the semiconductor chip shape on a front side of the wafer. After recognition, the dicing process is performed. By using this conventional method of sawing along the back side of the wafer, some of the aforementioned problems may be solved. However, there is a disadvantage associated with using this conventional method since the semiconductor chip shape on the front side is recognized through the back side of the wafer, the recognition efficiency may be lower than direct recognition of the front side of the wafer. Direct recognition of the front side of the wafer reduces cutting defects that may occur due to misalignment of the sawing blade when recognition is performed from the back side of the wafer.

SUMMARY OF THE INVENTION

According to a feature of an embodiment of the present invention, there is provided an apparatus for cutting a wafer along a back side of the wafer that directly recognizes the semiconductor chip shape formed on a front side of the wafer.

According to an aspect of an embodiment of the present invention, an apparatus for cutting a wafer is provided which includes a chuck table, in which a hole is formed, wherein a wafer is mounted on the chuck table with a front side of the wafer facing down, a camera installed under the hole of the chuck table for recognizing the semiconductor chip shape of the front side of the wafer exposed through the hole, a sawing blade for cutting a back side of the wafer mounted on the chuck table, and a controller electrically connected to the chuck table, the camera and the sawing blade for controlling the driving of the chuck table, the camera and the sawing blade, wherein the controller drives the sawing blade to cut the wafer after the controller properly aligns the location of the wafer to the sawing blade by moving the chuck table according to information regarding the wafer directly recognized by the camera.

Preferably, the diameter of the hole of the chuck table is in the range of approximately 5–10 cm.

These and other features and aspects of the present invention will be readily apparent to those of ordinary skill in the art upon review of the detailed description that follows.

DETAILED DESCRIPTION OF THE INVENTION

Korean Patent Application No. 2001-46264, filed on Jul. 31, 2001, and entitled "Apparatus for Cutting a Wafer," is incorporated by reference herein in its entirety.

The present invention will now be described more fully hereinafter with reference to the accompanying drawings, in which a preferred embodiment of the present invention is shown. The present invention may, however, be modified in different forms and should not be construed as limited to the embodiment set forth herein. Rather, this embodiment is provided so that this disclosure will be thorough and complete, and will fully convey the scope of the invention to those skilled in the art. Like reference numbers correspond to like elements throughout.

Figure 1:
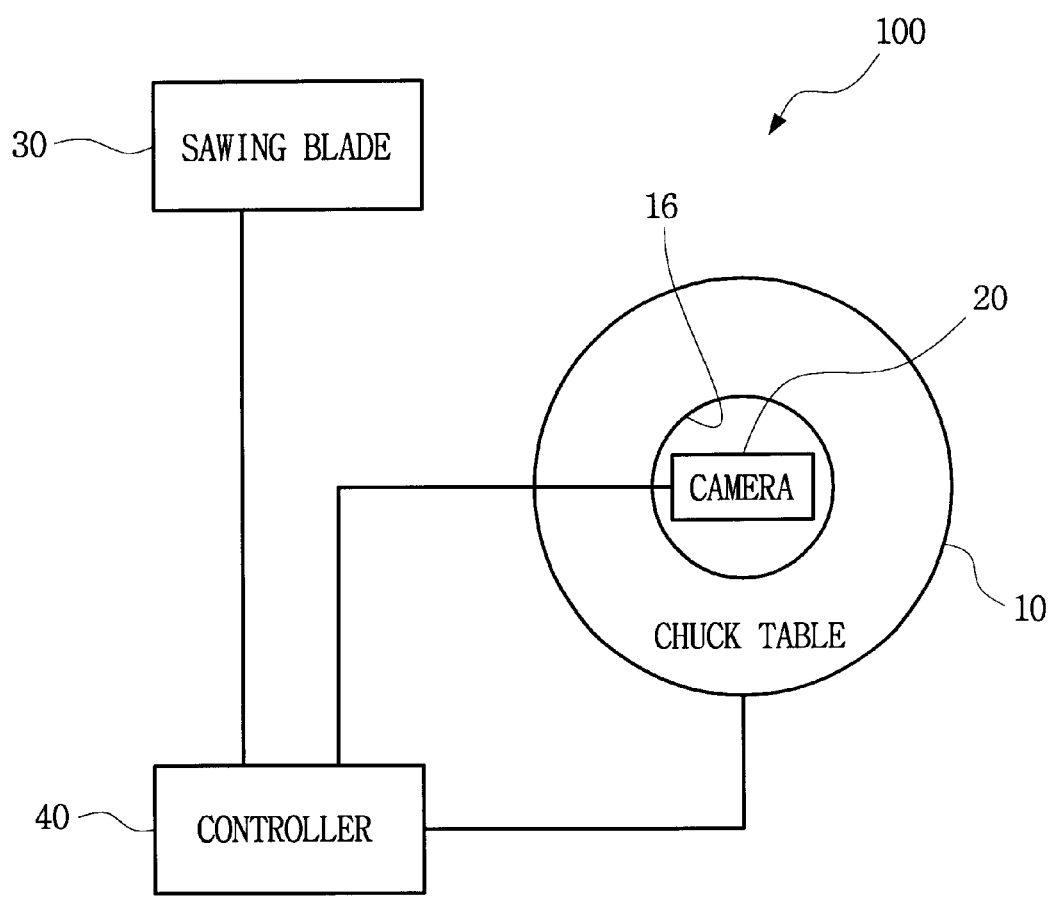
FIG. 1 illustrates a schematic block diagram of an apparatus for cutting a wafer according to an embodiment of the present invention.

FIG. 1 illustrates a schematic block diagram of an apparatus for cutting a wafer 100 according to an embodiment of the present invention. Referring to FIG. 1, the apparatus for cutting a wafer, which is a device progressing, cutting process of a back side of a wafer, includes a chuck table 10, a camera 20, a sawing blade 30 and a controller 40. The chuck table 10 for holding and aligning the wafer is controlled by the controller 40 and a hole 16 is formed in a center portion of the chuck table 10. The wafer is mounted on the chuck table 10 so that a front side of the wafer, on which semiconductor chips are formed, is facing down. The camera 20, installed under the hole 16, recognizes the semiconductor chip shape on the front side of the wafer exposed through the hole 16, and transfers the recognized semiconductor chip shape to the controller 40. The sawing blade 30, which is controlled by the controller 40, cuts along the back side of the wafer and separates the wafer into each diced chip using a conventional diamond sawing blade. The controller 40 is electrically connected to the chuck table 10, the camera 20 and the sawing blade 30, and controls the driving of the chuck table 10, the camera 20 and the sawing blade 30. More specifically, after the controller 40 properly aligns the location of the wafer to the sawing blade 30 by transferring the information regarding the wafer directly recognized by the camera 20 to the chuck table 10, the controller 40 progresses the dicing process of the wafer by driving the sawing blade 30.

Figure 2:
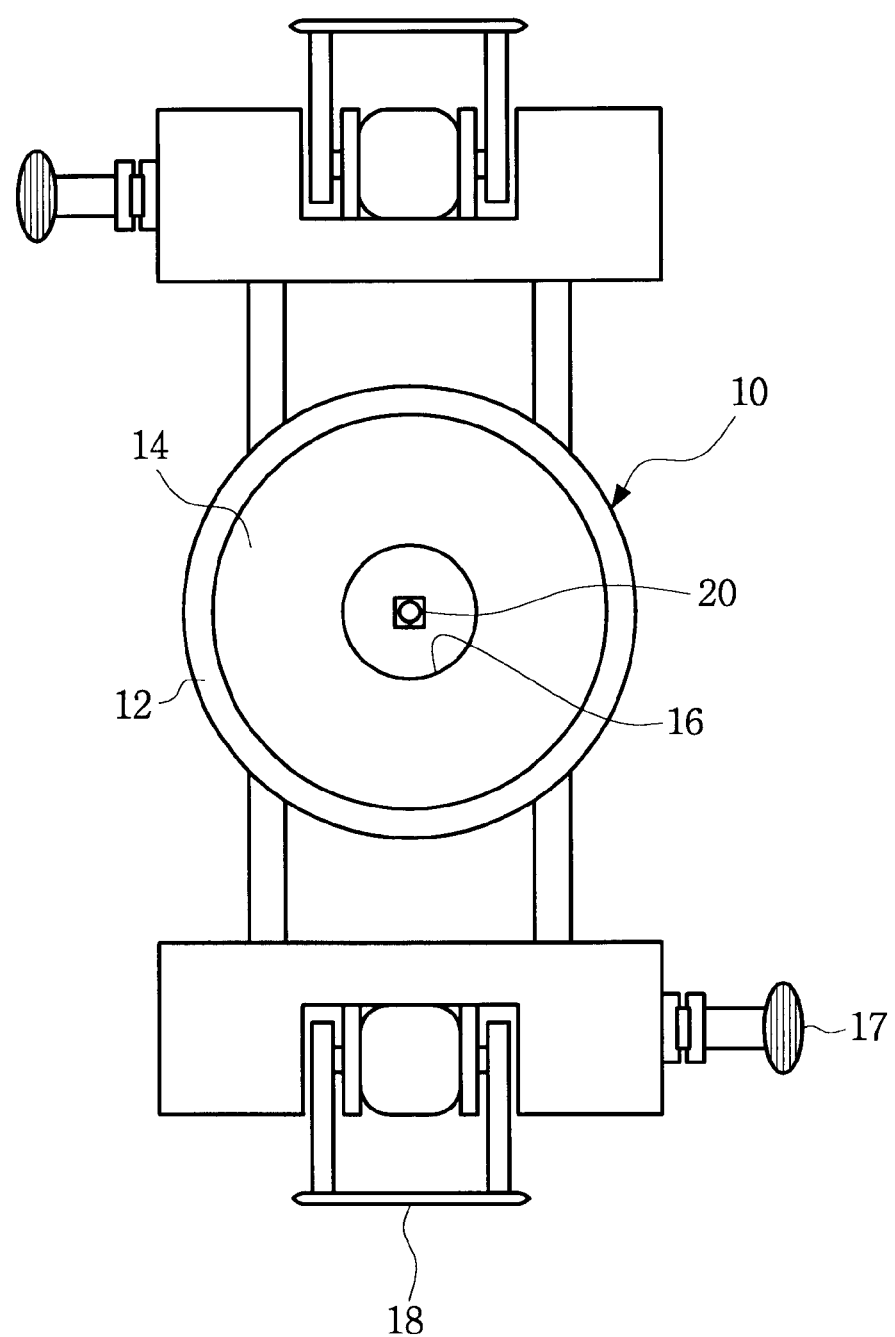
FIG. 2 illustrates a top view of an apparatus for cutting a wafer in which a camera is installed under a hole of a chuck table according to an embodiment of the present invention.
Figure 3:
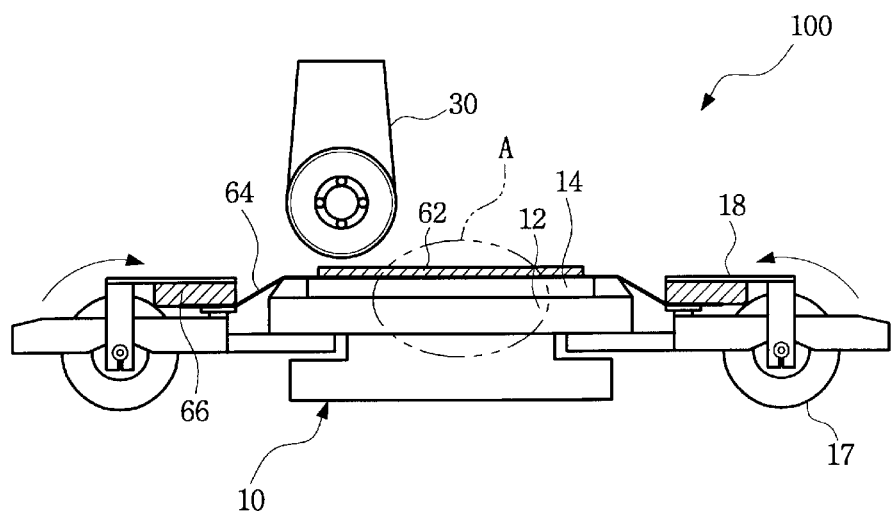
FIG. 3 illustrates a cross-sectional view showing an apparatus for cutting a wafer according to an embodiment of the present invention.
Figure 4:
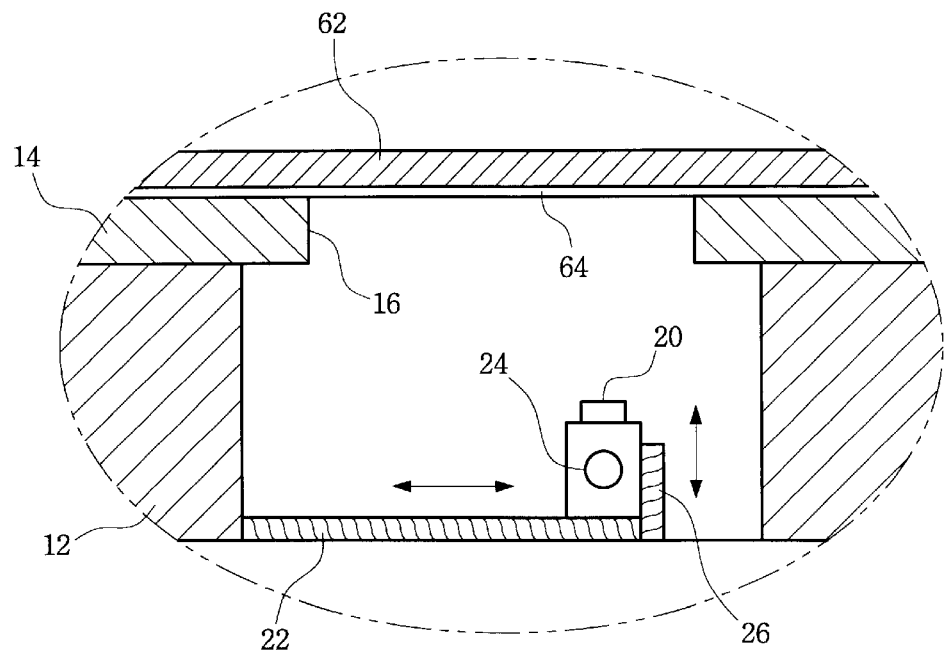
FIG. 4 illustrates a magnified cross-sectional view of "A" taken from FIG. 3.

The apparatus for cutting a wafer 100 will be explained in greater detail with reference to FIG. 2 through FIG. 4. The chuck table 10 is comprised of a table body 12, a vacuum pressure table 14 and a ring clamp 18. The table body 12 has a round shape, and there is provided space for installing the vacuum pressure table 14 in a center portion of the table body 12. The vacuum pressure table 14, which is installed on the center portion of the table body 12, is utilized as a means for holding a mounted wafer 62 by application of a vacuum. The vacuum pressure table is manufactured of a porous material having no electrical conductivity.

The ring clamp 18 fixes a wafer ring 66 wherein the wafer 62 is positioned in the center portion of the wafer ring 66. Specifically, to facilitate the dicing process and the diced chip attachment process after the dicing process, the wafer 62 is placed in the center portion of the wafer ring 66 having a ring shape and diameter larger than the diameter of the wafer 62. The wafer 62 is fixed to the wafer ring 66 by a ring tape 64. Accordingly, when the wafer ring 66, to which the wafer 62 is attached, is transferred to the chuck table 10, the portion on which the wafer 62 is attached is placed on the vacuum pressure table 14, and the wafer ring 66, outside of the wafer 62, is placed in the ring clamp 18. In addition, the wafer 62 is fixed to the vacuum pressure table 14 by a vacuum, and the wafer ring 66 is fixed by the ring clamp 18. Moreover, the size of the wafer ring 66 is adjustable by a handle 17. The size of the wafer ring 66 may be varied according to the diameter of the wafer to be cut. Typical wafer diameters are 6-inches, 8-inches and 12-inches. The handle for adjustment 17 adjusts the size of the wafer ring by adjusting the location of the ring clamp 18.

With regard to the size of the hole 16 in the vacuum pressure table and chuck table, it is preferable to form the hole so that the vacuum pressure table 14 is capable of holding the wafer 62 securely and so that the camera 20 is capable of recognizing a minimum semiconductor chip shape required for the dicing process. According to an embodiment of the present invention, the diameter of the hole 16 of the vacuum pressure table 14 is preferably in the range of approximately 5 cm–10 cm. Additionally, the size of the hole 16 may be varied according to the size of the vacuum pressure table 14.

The camera 20 is installed under the hole 16 to recognize the semiconductor chip shape of the front side of the wafer 62 exposed through the hole 16. The camera 20 includes an X-axis driver 22, a Y-axis driver 24 and a Z-axis driver 26. Accordingly, these drivers are capable of moving the camera 20 in three dimensions. Since the front side of the wafer 62 must be covered by the ring tape 64, it is preferable to use a transparent ring tape.

The dicing process using the apparatus for cutting a wafer 100 according to the present invention will now be explained. First, the wafer ring 66 in which the wafer 62 is attached, front side down, to the ring tape 64 is loaded on the chuck table 10 and a vacuum is applied to hold the wafer 62 securely. Next, the camera 20 installed under the hole 16 directly recognizes the semiconductor chip shape on the front side of the wafer 62 and transfers the recognized information to the controller 40. Based on the transferred information regarding the semiconductor chip shape on the front side of the wafer 62, the controller 40 properly aligns the wafer 62 to the sawing blade 30 by moving the chuck table 10. Next, the controller 40 progresses the dicing process thereby separating the wafer 62 into individual chips along the back side of the wafer 62 by driving the sawing blade 30. Finally, after completion of the dicing process, the wafer ring 66 is unloaded from the chuck table 10.

According to an embodiment of the present invention, when a wafer is mounted on a chuck table so that a front side of the wafer is faced down, cutting defects may be minimized because the semiconductor chip shape on the front side of wafer is directly recognized by a camera installed under a hole in the chuck table.

A preferred embodiment of the present invention has been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. An apparatus for cutting a wafer, comprising:

a chuck table in which a hole is formed, wherein a wafer is mounted on the chuck table so that a front side of the wafer is facing down;

a camera installed under the hole in the chuck table for directly recognizing the semiconductor chip shape on the front side of the wafer exposed through the hole;

a sawing blade for cutting a back side of the wafer mounted on the chuck table; and a controller electrically connected to the chuck table, the camera and the sawing blade for controlling the driving of the chuck table, the camera and the sawing blade, wherein the controller drives the sawing blade to cut the wafer after the controller properly aligns the location of the wafer to the sawing blade by moving the chuck table according to the information regarding the wafer directly recognized by the camera.

2. The apparatus for cutting a wafer as claimed in claim 1, wherein the diameter of the hole in the chuck table is in the range of approximately 5–10 cm.

3. The apparatus for cutting a wafer as claimed in claim 1, wherein the front side of the wafer is attached to a wafer ring by a ring tape.

4. The apparatus for cutting a wafer as claimed in claim 3, wherein the ring tape is transparent.

5. The apparatus for cutting a wafer as claimed in claim 1, wherein the chuck table comprises:

a vacuum pressure table for holding the wafer; and a table body surrounding the vacuum pressure table, wherein the hole in the chuck table is formed in the center portion of the vacuum pressure table.

* * * * *